Jan. 26, 1937.  L. E. W. VAN ALBADA  2,068,829
REDUCING TELESCOPIC VIEW FINDER FOR PHOTOGRAPHIC CAMERAS
Filed April 26, 1932   3 Sheets-Sheet 1

Inventor:
Lieuwe E.W. van Albada

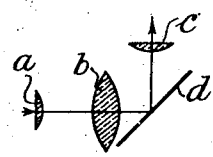
Fig. 8
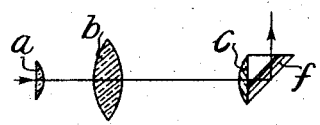
Fig. 9
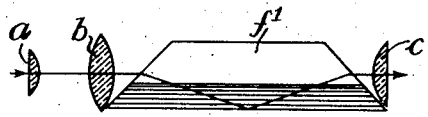
Fig. 10
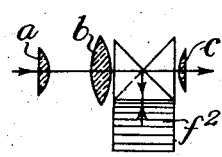
Fig. 11
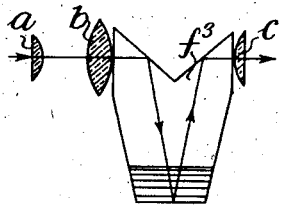
Fig. 12
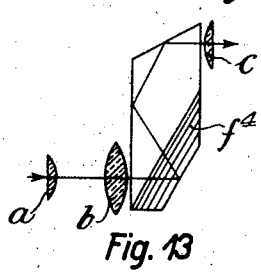
Fig. 13
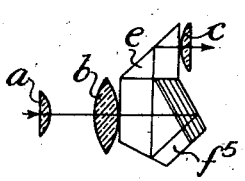
Fig. 14
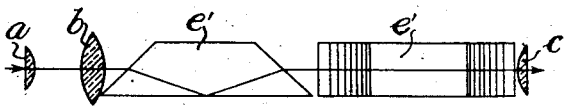
Fig. 15
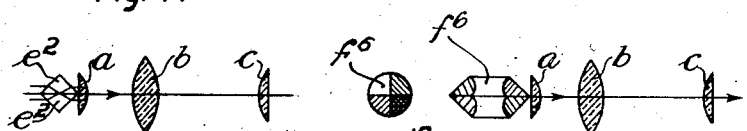
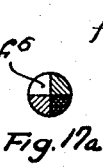
Fig. 16  Fig. 17a  Fig. 17

Jan. 26, 1937.  L. E. W. VAN ALBADA  2,068,829
REDUCING TELESCOPIC VIEW FINDER FOR PHOTOGRAPHIC CAMERAS
Filed April 26, 1932  3 Sheets-Sheet 3

Inventor:
Lieuwe E. W. van Albada

Patented Jan. 26, 1937

UNITED STATES PATENT OFFICE 2,068,829

REDUCING TELESCOPIC VIEW FINDER FOR PHOTOGRAPHIC CAMERAS

Lieuwe E. W. Van Albada, Amsterdam, Netherlands, assignor to the firm of Carl Zeiss, Jena, Germany Application April 26, 1932, Serial No. 607,620
In Germany May 1, 1931

3 Claims. (Cl. 88—1.5)

Application has been filed in Germany May 1, 1931.

The object of the invention is the construction of reducing telescopic view finders which are free of distortion and have a very wide field of view, these finders being used in connexion with photographic cameras and made of most simple optical means which can be manufactured at low cost on a large scale. By simple optical means is to be understood plano and bi-convex lenses of plate glass or any other commonly used glass.

Either the telescopic view finders with simple thin lenses are not distortion-free, producing as they do a strongly curved image field which is due to the arrangement of the lenses corresponding in no way to the most favourable general effect, or the absence of any distortion is obtained by applying costly optical means prohibiting large-scale manufacture.

The reducing telescopic view finder consists in its simplest form of three single lenses, viz. the objective, the collective, and the ocular. With a view to obtain the slightest distortion possible, the distance apart of the vertices of the objective and the collective facing each other is made equal to at least 82% of the system represented by the focal length of the objective and the collective.

With a view to obtain a field of view as wide as possible, it is convenient to depart from the bi-convex lenses used so far and to apply as a front lens a plano-convex lens, and this because plano-convex lenses produce an image field which is only slightly curved and distorted when the plane surface is made to face the object and when the entrance pupil is at the correct distance in front of the lens (this distance being approximately equal to the length of the radius). This favourable effect is due to the nearly symmetrical path of the rays through the lens, the symmetrical path causing the slightest possible deviations. The image is distorted to the shape of a barrel, since the deviation of the principal rays towards the axis is the stronger the farther away these rays are from this axis when they traverse the lens. This distortion is to be neutralized by the collective and the ocular.

A telescopic view finder for photographic cameras conveniently produces a reduced image of the object, since the ocular lens, which is small in itself and which is to be used also by persons wearing spectacles, only can afford a viewing angle inferior to that of the field of view of the photographic camera which embraces in most cases more than 50°. In order to produce a definite diminution, for instance, a two-fold diminution, the focal length of the ocular is to be approximately twice that of the objective since a common focal plane lies between both lenses. When the objective is of a given size, the length of the entire system is determined and, owing to the collective, which lies in or near the common focal plane, having to image in conjunction with the objective the ocular lens as an entrance pupil of the telescope at a suitable place and, at the same time, in conjunction with the ocular the objective approximately at the place of the turning point of the eye of the person using the instrument, also the power of the collective is determined, the consequence being that there only remains to give this collective the most favourable form and position possible.

In the accompanying drawings, Figure 1 is a schematical reproduction of the theoretical principles.

Figures 2 to 23 represent, each in a longitudinal section, constructional examples of the invention.

Figure 1:
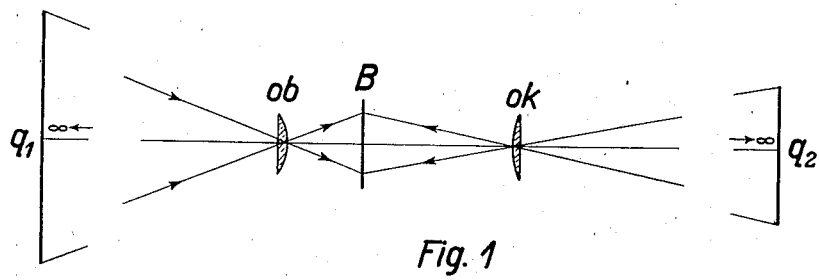

The condition of non-distortion of a telescope of this kind may be described as follows:

Suppose that in Figure 1 $ob$ represents the objective which images in its focal plane B a reticulated square $q_1$ being disposed at an infinitely great distance, the ocular $ok$ having a focal length which is twice as great will image also in the common focal plane B (for instance a frosted glass screen) and in approximately the same size the reticulated square $q_2$ which is half as big and also lies at an infinitely great distance. If both images are identical, that is to say, if they have the same distortion, the finder image will be free of distortion. The image produced by the objective is more strongly distorted to the shape of a barrel than that which is produced by the ocular, which is due to the first image angle being twice the second one. The consequence is that there remains a difference in the distortion, this difference having to be corrected by the collective. This is possible indeed, since the collective deviates the divergent marginal rays coming from the objective towards the axis in a comparatively stronger convergent manner than the rays nearer the axis. The image produced by the objective is thus given by the collective the opposite distortion the value of which is to be equal to the above mentioned difference.

The distortion of a bi-convex lens is smallest, that is to say practically equal to zero, when this lens is traversed by the principal rays as symmetrically as possible. If the collective is now removed from the objective, the desired correction obtains very soon because the divergent principal rays traverse the collective in proximity to the margin. Continuously increasing the distance would cause a super-correction and decreasing the distance an under-correction. There consequently exists a position in which the collective exactly neutralizes the above-mentioned difference; this difference not being great, the most favourable position is near that in which the principal rays have as symmetric a passage as possible. With a view to provide this correction in the objective image, the ray pencils are to strike the collective previous to producing an image. For this reason it would not be correct to place the collective behind the objective image, as has been done sometimes, because in this case it would leave the image on the object side unaltered and detrimentally influence the image which in Figure 1 is assumed to be on the ocular side, as well as greatly increase the curvature of the virtual image field. What requires being corrected is the more strongly distorted image on the object side and not the slightly distorted image on the ocular side.

The lens termed "collective" in the preceding text therefore is in reality the rear member of an objective consisting of two lenses which in itself furnishes a distortion-free image or, at option, an image slightly distorted to barrel form. Owing to the convergence of the leaving principal rays, the latter image may be viewed by means of a magnifier visually slightly distorting to cushion form, in which manner a finder image free of distortion is obtained.

Slight alterations in shape of the lenses bear only a slight influence upon the image, provided that they do not influence too strongly the symmetrical ray path.

Figure 2:
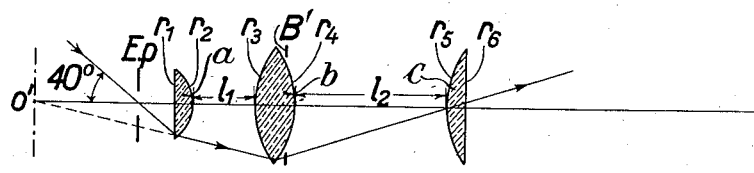
Figure 3:
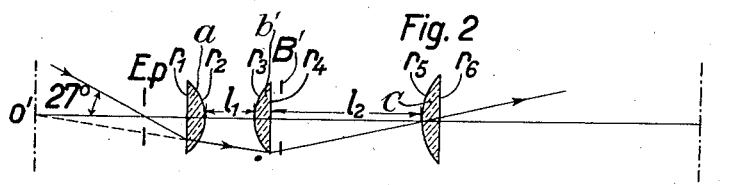

The above is arithmetically explained in two examples, namely, in Figure 2, in which the front member $a$ is a plano-convex lens and in which the collective or second member $b$ is a bi-convex lens, and in Figure 3, in which the collective or second member $b'$ is plano-convex.

From the telescopic view finder according to Figure 2 are obtained the following data:

$r_1 = \infty$   $d_1 = 2$
$r_2 = -4.3$   $l_1 = 6.5$
$r_3 = +10$   $d_2 = 3.6$
$r_4 = -10$   $l_2 = 16.5$
$r_5 = +10$   $d_3 = 2$
$r_6 = \infty$ With all lenses, $n_D$ is equal to 1.525.

The position of the collective $b$, which is approximately at equal distances from the ocular $c$ and the image $o'$ of this ocular, shows that the ray path through the collective $b$ is practically symmetrical. This slight deviation from the symmetrical ray path is just sufficient to compensate for the distortion difference. The entrance pupil E.p. is at a distance in front of the front lens $a$ which is equal to the radius; the image of the objective is behind the ocular $c$; the the objective image, which embraces an angle of approximately 80°, lies near the rear side of the lens $b$, where the image field diaphragm B' is to be positioned.

From the telescopic view finder according to Figure 3 are obtained the following data:

$r_1 = \infty$   $d_1 = 3$
$r_2 = -10$   $l_1 = 10.9$
$r_3 = +10$   $d_2 = 3$
$r_4 = \infty$   $l_2 = 31$
$r_5 = +15$   $d_3 = 3$
$r_6 = \infty$ With all lenses, $n_D$ is equal to 1.525. The practical advantage of the telescopic view finder according to Figure 3, which comprises an image field of 54°, consists in the two first members being identical in themselves, which simplifies, and reduces the cost of, the construction. Even the lens $c$ could be identical with the lenses $a$ and $b'$, in which case, however, the diminution would be too slight to furnish a clear image. This finder is characterized by a specially plane image field.

Figure 4:
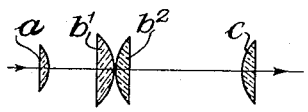

The rear member of the objective may be replaced by two plano-convex lenses whose vertices touch each other, because an approximately symmetrical ray path is attained also in this case. In Figure 4, the collective or second member consists of two plano-convex lenses $b^1$ and $b^2$.

Telescopic view finders according to the form represented in Figures 2 and 3, however, are not readily adapted to be used in practice, since they furnish inverted images. For this reason the said series of lenses require image reversion devices, the manner of the image reversion, which consists at least in a simple inversion of the objects (that is to say, an inversion not neutralizing the mirror effect), depending upon the type of the photographic camera.

Figures 5 to 22 represent examples for simple image inversion and complete image reversion in telescopes according to Figure 2 or 3, the simple inversion being attained by one reflexion on plane mirrors or reflecting prisms and the complete reversion by an even number of reflexions which in most cases take place on roof prisms.

Figure 5:
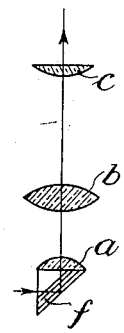

In the example according to Figure 5 the first lens $a$, and in the example according to Figure 9 the ocular lens $c$, may be ground or cemented to the roof of the reflecting prism $f$.

The ocular lenses which touch with their vertices a plane prism surface may, when reversed, be cemented to the said prism. In this case much of the ocular lenses is to be stopped down, which is not practical.

Figure 7:
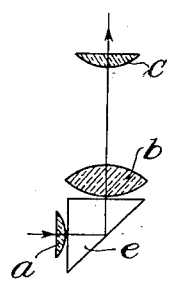

In Figure 5 a roof prism $f$ in the ray path of the finder is disposed before the lens $a$, and in Figure 9 behind the lens $c$. In Figure 7 a reflecting prism $e$ lies between the lenses $a$ and $b$, and in Figure 8 a plane mirror $d$ is placed between the lenses $b$ and $c$.

As a rule, image view finders are disposed laterally above the objective, which causes parallax between finder image and objective image when photographs are to be taken at a short range.

Figure 6:
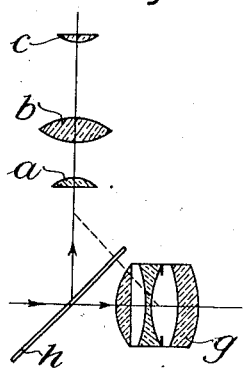

This parallax can be avoided according to Figure 6 by applying a telescopic view finder according to Figure 2 or 3 with vertical axis and by disposing in front of the objective $g$ of the photographic camera a plano-parallel plate $h$ inclined at 45° towards the objective axis. The telescopic view finder is so adjusted that the centre of the objective diaphragm is the reflected image of the centre of the entrance pupil of the finder. Below the plano-parallel plate is provided a deep-black layer.

In Figures 10 to 15 a prism body effecting a complete image reversion is disposed between the lenses $b$ and $c$ in the ray path of the finder. The roof prism is in Figure 10 a straight-vision prism $f^1$, in Figure 11 a so-called Porro secondary reversion prism $f^2$, in Figure 12 an Abbe prism $f^3$, in Figure 13 a Leman roof prism $f^4$, in which the axial ray is displaced in parallel, in Figure 14 a pentagonal Hensoldt prism $f^5$ effecting an identical parallel displacement and which has a roof edge at one side and is at the contiguous side connected to a totally reflecting rectangular prism $e$, and in Figure 15 two Dove prisms $e'$ lying behind each other and whose reflecting surfaces are displaced relatively to each other at 90°.

In Figure 17 is illustrated (for the sake of distinctness on somewhat too large a scale) a system of four small roof prisms $f^6$ disposed before the front lens $a$. Figure 17a illustrates the four roof prisms $f^6$ as seen in the direction of the arrows in Figure 17. This system is a wide-angled and completely reversing system which may be very small.

In Figure 16 only a simple inversion takes place, the entrance pupil, as also in Figure 17, being brought approximately into the centre of the reversing system, which consists of two rectangular prisms $e^2$ whose reflecting surfaces touch each other.

Figure 18:
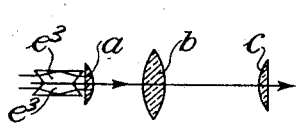
Figure 20:
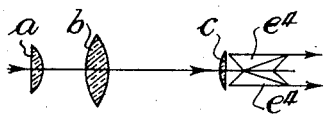

In Figure 18, two reflecting prisms $e^3$ are placed in front of the objective in such a manner that their reflecting surfaces act inwardly. In Figure 20, the prisms $e^4$ are placed in the same manner, but behind the ocular. These systems afford an image reversion for a very wide field (up to approximately 90°) also when the respective pupil is just outside the system.

Figures 19, 19A:
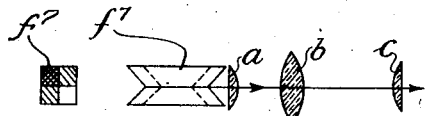

In Figure 19, the roof edges of four roof prisms $f^7$ are turned towards outside in order to effect a complete image reversion over a wide field and within a narrow space. Figure 19a illustrates the four roof prisms $f^7$ as seen in the direction of the arrows in Figure 19.

Figure 21:
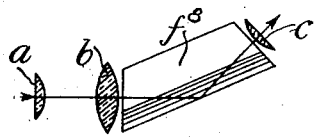
Figure 22:
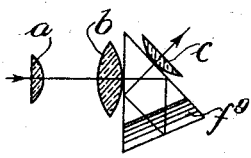

In Figures 21 and 22 roof prisms $f^8$ and $f^9$, respectively, are so placed between the lenses $b$ and $c$ that the axis of exit is inclined relatively to the axis of entrance.

Figure 23:
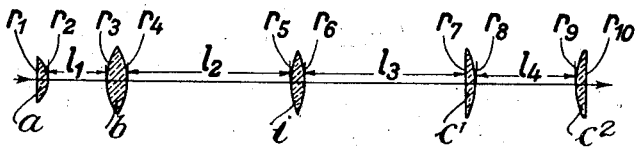

Instead by reflexion, a complete image reversion may as well take place by means of a series of lenses according to Figure 23, in which case all of the middle lens, except a small aperture, is stopped down. The objective consists of the lenses $a$ and $b$. The image produced by the objective is reversed by the lens $i$. The ocular is composed of the lenses $c^1$ and $c^2$. The data for this lens series are as follows:

$r_1 = \infty$  $d_1 = 2$
$r_2 = -4.7$  $l_1 = 7$
$r_3 = +10$  $d_2 = 4$
$r_4 = -10$  $l_2 = 25$
$r_5 = +14$  $d_3 = 3$
$r_6 = -14$  $l_3 = 26$
$r_7 = \infty$  $d_4 = 2$
$r_8 = -12$  $l_4 = 17$
$r_9 = +10$  $d_5 = 2.5$
$r_{10} = \infty$ Diaphragm behind lens $r_5$, $r_6 = 3.5$
With all lenses, $n_D$ is equal to 1.525.

Photographic cameras for horizontally and vertically elongated pictures may be equipped with a fixed rectangular image field diaphragm, provided that a telescopic straight-vision finder with completely reversed image is used. The same holds good in the case of Figures 8 and 9, where, however, the image reversing reflector (or the prism) and the ocular lens are to be rotatable about the entrance axis of the finder. Independently of the position of this revoluble part, the finder image, owing to the fixed image field diaphragm, always corresponds to the image projected on the plate also when the image is only simply inverted by means of a plane mirror.

Figure 24:
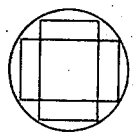
Figures 24 and 25 illustrate details.
Figure 25:
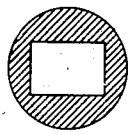

If in a telescopic straight-vision finder the image is only simply inverted, the image field diaphragm must be either stationary, according to Figure 24, or revoluble through 90° about the finder axis, according to Figure 25, because the finder itself, or at any rate its inverting system, must be turned through 90° about the finder axis when changing from a horizontally elongated to a vertically elongated image.

When the image field of the finder is horizontal, use must be made either of a stationary cross-shaped diaphragm according to Figure 24 or of a diaphragm rotatable through 90° about the finder axis according to Figure 25, in which case also the telescopic finder is to be rotatable about an axis parallel to that of the photographic objective. For this reason the arrangement according to Figures 8 and 9 with rotatable rear part is very suitable and advantageous.

I claim:

1. A reducing telescopic view finder for photographic cameras, comprising an objective which consists of two thin converging lenses, a diaphragm disposed behind the objective, and an ocular, the distance apart of the vertices of those surfaces of the said two lenses which face each other being approximately 83% of the focal length of the objective, and those principal rays which traverse the said two lenses approximately symmetrically providing an image without distortion and converging approximately at the locus of the ocular.

2. A reducing telescopic view finder for photographic cameras, comprising an objective which consists of two converging lens systems, a diaphragm disposed behind the objective, and an ocular, the distance apart of the vertices of those surfaces of the said two lens systems which face each other being approximately 83% of the focal length of the objective, and those principal rays which traverse the said two lenses approximately symmetrically providing an image without distortion and converging approximately at the locus of the ocular.

3. A reducing telescopic view finder for photographic cameras, comprising an objective which consists of two thin converging lenses, a diaphragm disposed behind the objective, an ocular, and reflecting means which deflect the axis of the finder, the distance apart of the vertices of those surfaces of the said two lenses which face each other being approximately 83% of the focal length of the objective, and those principal rays which traverse the said two lenses approximately symmetrically providing an image without distortion and converging approximately at the locus of the ocular.

LIEUWE E. W. VAN ALBADA.